G. H. ECKMAN.
NUT LOCK.
APPLICATION FILED JULY 29, 1915.

1,186,531.

Patented June 6, 1916.

WITNESSES:
Howard D. Orr.
Watts F. Estabrook

George H. Eckman, INVENTOR,

BY

Attorney

UNITED STATES PATENT OFFICE.

GEORGE H. ECKMAN, OF SAN FRANCISCO, CALIFORNIA.

NUT-LOCK.

1,186,531.      Specification of Letters Patent.      Patented June 6, 1916.

Application filed July 29, 1915. Serial No. 42,617.

*To all whom it may concern:*

Be it known that I, GEORGE H. ECKMAN, a citizen of the United States, residing at San Francisco, in the county of San Francisco and State of California, have invented a new and useful Nut-Lock, of which the following is a specification.

This invention relates to an improvement in nut locks, and the object is to provide means which may be compressed upon the screwing of the nut upon a bolt, for locking the nut on the bolt against accidental removal.

A further object is in the provision of a device which is simple in construction, and can be manufactured at a small cost.

The invention consists of certain novel features of construction and combinations of parts which will be hereinafter described and pointed out in the claims.

It is evident that various changes in the form, proportion, material and minor details of construction, within the scope of the appended claims, may be made without departing from the spirit or sacrificing any of the advantages of the invention.

Figure 1:
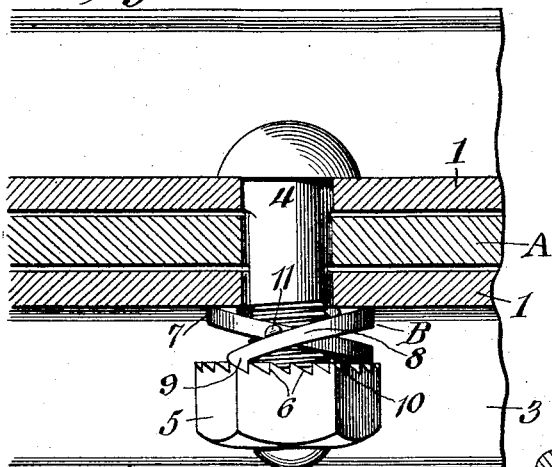
Figure 2:
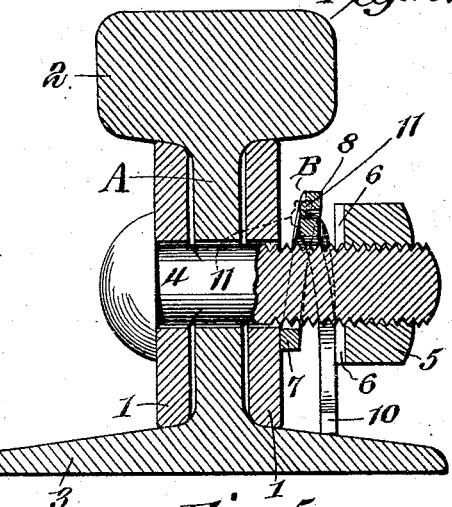
Figure 3:
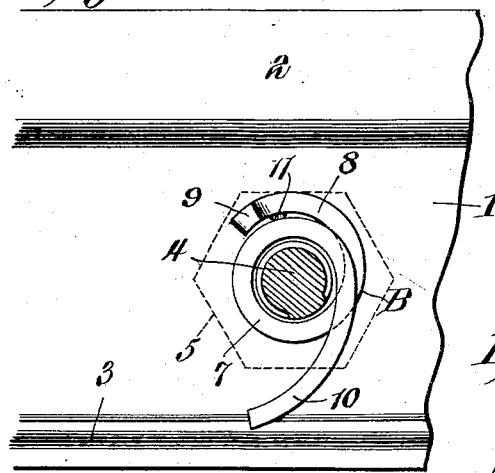
Figure 5:
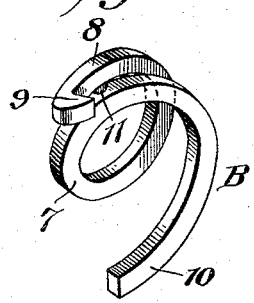
Figure 4:
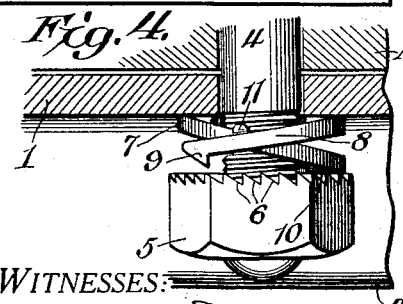
Figure 6:
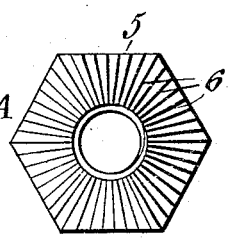
Figure 7:
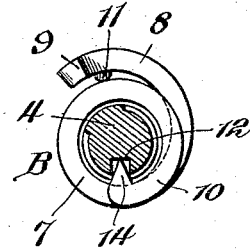

In the accompanying drawings:—Figure 1 is a top plan view of the invention, showing a web of a rail and fish plates in section; Fig. 2 is a transverse sectional view; Fig. 3 is a view in side elevation, showing the invention applied to a bolt, with the bolt in section, and the fish plate and rail in elevation; Fig. 4 is a top plan view showing the position of the fastening means when the nut is to be removed from the bolt; Fig. 5 is a perspective view of the fastening means; Fig. 6 is a view in side elevation of the serrated face of the nut; Fig. 7 is a view in side elevation, showing a slightly modified form of locking means applied to a bolt.

A, represents the web of a rail, and located on each side thereof is a fish-plate 1. The fish-plates are interposed between the tread 2 and base flange 3 of the rail, and are connected to the web by means of a bolt 4 which passes through the fish-plates and web of the rail.

A nut 5 is adapted to be screwed upon the screw-threaded portion of the bolt 4, and the inner face of the nut is provided with serrations or teeth 6, which radiate from the center of the nut, and are in the form of ratchet-teeth.

Interposed between the nut 5 and one of the fish plates 1 is a flexible washer or locking means B, having its ends bent laterally away from and extending past each other, and which consists of a bar or rod of metal, preferably of steel, wound spirally to form a coil 7. The bolt 4 is inserted through the coil 7, and the coil is loosely mounted on the bolt. The inner terminal of the flexible washer is bent outwardly and forwardly over the coil, and projects outwardly sufficiently to be engaged by the nut 5 as it is screwed upon the bolt 4. The end of the inner terminal 8 is provided on its outer surface with an integral tooth 9, which is adapted to be engaged by a tooth 6 for locking the nut 5 against accidental removal.

The outer terminal 10 of the flexible washer B, is provided with anchoring means to hold the coil or washer from turning on the bolt, the anchoring means being disclosed in Figs. 2, 3 and 5 of the drawing, as comprising substantially a tangential projection or elongation of the outer terminal which extends downwardly and engages the base flange 3 of the rail for holding the flexible washer against rotation during the compression of the flexible washer, for the purpose of placing it under sufficient tension to hold the nut on the bolt against removal.

When the nut 5 is screwed upon the bolt 4, the flexible washer, which is made of resilient material, will be compressed, as both the inner and outer terminals of the flexible washer will be engaged by the nut 5 as it is screwed onto the bolt. Upon the compression of the flexible washer the teeth 6 of the nut will come in contact with the tooth 9 of the inner terminal 8, the tooth 9 traveling over the teeth 6 and not interfering with the screwing of the nut 5 onto the bolt 4. After the nut has been screwed sufficiently upon the bolt 4, it will be prevented from rotating in an opposite direction and removed, as the tooth 9 will engage a tooth 6 of the nut, and hold the nut against removal.

To remove the nut from the bolt, a tool, such as a chisel or screw-driver, may be inserted between the inner face of the nut and the inner terminal 8 of the flexible washer for forcing the tooth 9 out of engagement with the tooth of the nut. Upon the removal of the tooth 9 from engagement with the nut 5, a lug or projection 11 on the toothed terminal of the flexible washer is caused to engage the inner face of the coil 7, thereby holding the tooth 9 out of the path of the teeth 6, so that the nut can be unscrewed from the bolt 4.

The lug or projecion 11 is formed on the lower inner surface of the inner or toothed terminal 8 of the flexible washer, and is adapted to be disengaged from the coil 7 when it is desired to release the inner or toothed terminal 8 of the flexible washer, so that the tooth 9 will be in a position to be engaged by the teeth of the nut 5.

When the tooth 9 is in a position to be engaged by the teeth 6 of the nut 5, the lug or projection 11 will rest upon the upper surface of the coil or portion 7 of the flexible washer B.

The lower portion of the coil 7 is adapted to engage one of the fish-plates 1, and the upper portion of the coil will be forced toward the fish-plate as the nut 5 is screwed onto the bolt 4, so that the flexible washer will be compressed for causing one terminal 8 to engage the nut 5 and hold it against rotation or removal, and the other terminal to engage the base flange 3 of the rail and hold the flexible washer against rotation.

In the form shown in Fig. 7, a modification of the anchoring means is shown, and wherein I have shown the bolt 4 provided with a longitudinal recess 12 on its lower surface, in which the inturned projection 14 of outer terminal 10 is received. The outer terminal 10 of the flexible washer B is provided with the upwardly extending portion 14 which enters the recess 12 for holding the flexible washer against movement. The recess or slot 12 extends longitudinally of the bolt 5, so that as the flexible washer is compressed the outer terminal 10 can be moved toward the object which is being fastened by the nut and bolt.

From Figs. 1 and 4, it will be noted that the inner and outer terminals 8 and 10 of the washer or coil lie substantially in the same vertical plane, or in a plane lying at right angles to the axis of the bolt upon which the lock is placed, and that by this formation the inner end or side of the coil is substantially flat so as to lie, when compressed, close against the fish plate 1, or other object surrounding the bolt and adapted to be compressed. In Fig. 1, the projection or lug 11 is shown disengaged from the body of the washer B, while in Fig. 4, the lug 11 is shown as engaging the side of the washer to hold the nut engaging terminal in retracted position, and out of the path of the teeth 6 of the nut, so that the nut may be freely turned to remove the same from the bolt.

It will be seen from the foregoing, that I have provided a nut lock which is applicable for fastening fish-plates to a rail, and parts of machinery together, and when the extension portion or terminal 10 is not feasible for fastening the parts together, as shown in Figs. 1 to 6, the form shown in Fig. 7 may be employed.

What is claimed is:—

1. A nut lock comprising a coil for engagement upon a bolt, having an anchoring outer terminal to prevent the rotation of the coil on the bolt, and having a nut engaging inner terminal bent spirally outward beyond the periphery of the coil and being carried forwardly over the coil for engagement with a nut to hold the same from retrograde movement.

2. In a nut lock, the combination with a bolt and nut, the nut having a plurality of teeth on the inner face thereof, of a coiled washer mounted on the bolt and held thereon against rotation, said washer having an inner terminal extending outwardly over the coiled portion of the washer, and a tooth formed on the end of the inner terminal and adapted to engage a tooth of the nut for holding the nut against removal.

3. A nut lock comprising a split washer for engagement over a bolt, having its opposite ends bent laterally away from and extending past each other, anchoring means on the outer end of the washer to hold the same from turning on the bolt, and nut engaging means on the inner end of the washer, said inner end being bent outwardly and forwardly over the washer for engagement with a nut to hold the same from retrograde movement upon the bolt.

4. In a nut lock, the combination with a bolt and nut, the nut having a plurality of teeth on the face thereof, of a coiled washer mounted on the bolt, a terminal of said washer being adapted to normally lie in a position to be engaged by the teeth of the nut for holding the nut against removal, and means on said terminal of the washer adapted to be forced into engagement with the coiled portion of the washer for holding the terminal out of engagement with the teeth of the nut.

5. In a nut lock, the combination with a bolt and nut, the nut having a plurality of teeth on the inner face thereof, of a coiled washer mounted on the bolt, said washer having inner and outer terminals, the inner terminal extending outwardly over the coiled portion of the washer, and having a tooth at the end thereof for engaging the teeth of the nut to hold the nut against removal, said inner and outer terminals of the coiled washer being adapted to be engaged by the nut as the nut is screwed onto the bolt for compressing the coiled washer to provide a substantially flat inner bearing surface for the coil, and to cause the tooth of the inner terminal to hold the nut against accidental removal.

6. In a nut lock, the combination with a bolt and nut, the nut having a plurality of teeth thereon, of a bar wound spirally forming a coiled washer, said coiled washer being mounted on the bolt, one terminal of said washer extending outwardly over said coiled portion into substantially the plane of the opposite terminal, a tooth on said first terminal adapted to engage a tooth of the nut for holding the nut against removal, the opposite terminal of the washer extending downwardly beneath the bolt, and means on said last-mentioned terminal for holding the washer against rotation.

7. In a nut lock, the combination with a bolt and nut, the nut having a plurality of teeth thereon, of a bar wound spirally forming a coiled washer and inner and outer terminals, said coiled washer being mounted on the bolt, the inner terminal of the washer extending outwardly over said coiled portion, a tooth on said terminal normally adapted to lie in a position to be engaged by the teeth of the nut, a lug on the lower surface of the inner terminal adapted to be forced into engagement with a side of the coiled portion of the washer for holding the tooth of the inner terminal out of engagement with the teeth of the nut, the outer terminal of the washer extending downwardly beneath the coil, and means engaging the outer terminal for holding the washer against rotary movement.

8. A nut lock comprising a coil for engagement upon a bolt, having anchoring means to hold the coil from turning on the bolt, and having a nut engaging terminal adapted to extend forwardly to engage with a nut on the bolt, and to hold the nut from retrograde movement, and holding means on the coil to retain the nut engaging terminal in retracted position, when forced backwardly from the nut.

9. A nut lock comprising a washer for engagement upon a bolt, having an anchoring terminal to hold the washer from turning upon the bolt, and having a forwardly extending terminal for engagement with a nut to prevent retrograde movement thereof on the bolt, and a lug extending inwardly from said forwardly extending terminal for engagement with the washer to hold said terminal out of engagement with the nut when retracted therefrom, and to admit the free turning of the nut for removal from the bolt.

In testimony, that I claim the foregoing as my own, I have hereto affixed my signature in the presence of two witnesses.

GEORGE H. ECKMAN.

Witnesses:
JOHN H. SIGGERS,
WATTS T. ESTABROOK.

Copies of this patent may be obtained for five cents each, by addressing the "Commissioner of Patents, Washington, D. C."